March 10, 1959  C. EDEN  2,877,280
PROCESS FOR PURIFYING GLASS
Filed June 4, 1954
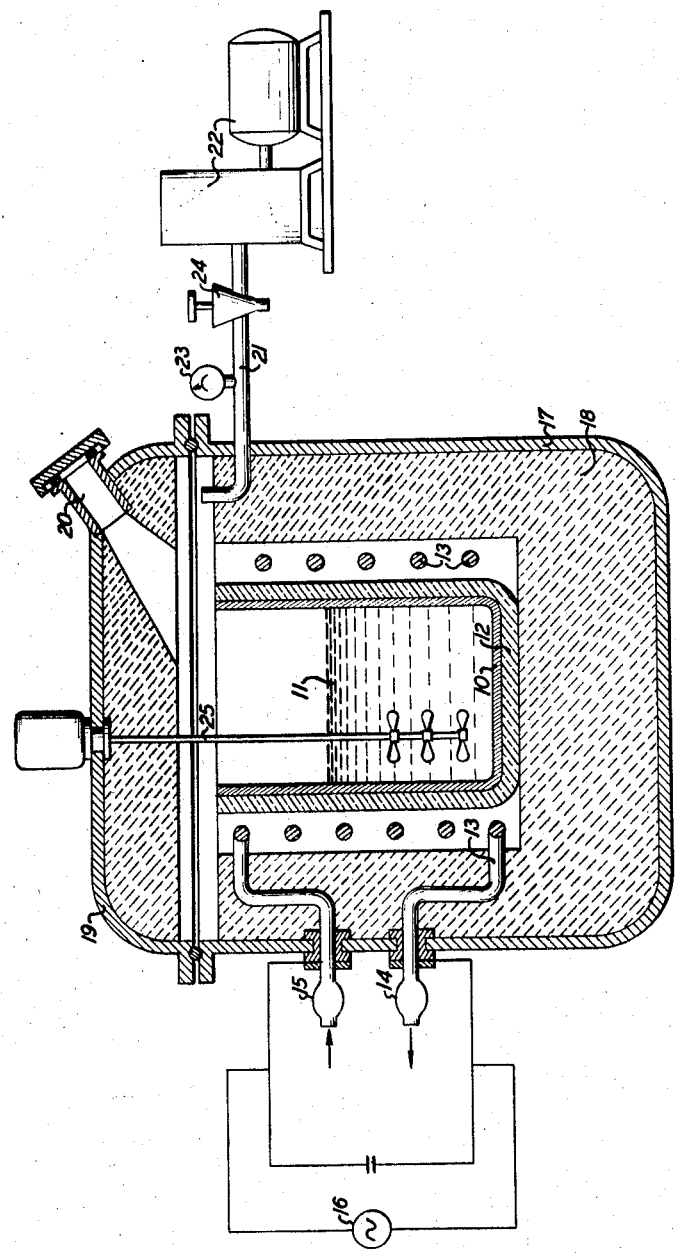
INVENTOR
CARSTEN EDEN United States Patent Office 2,877,280
Patented Mar. 10, 1959

2,877,280

PROCESS FOR PURIFYING GLASS

Carsten Eden, Mainz, Germany, assignor to Jenaer Glaswerk Schott & Gen., Mainz, Rhineland-Pfalz, Germany Application June 4, 1954, Serial No. 434,652

Claims priority, application Germany June 11, 1953

4 Claims. (Cl. 13—6)

This invention refers to a process of purifying or refining glass. Processes of this kind so far known are based on raising the temperature of the glass melt and inducing a vehement formation of gas in the melt. Such processes, however, do not suffice for technical requirements because, first they take very long and second, because some glasses cannot be sufficiently purified in this way at all. This applies also when the refining takes place in a platinum crucible, so that the generation of bubbles cannot be due to dissolution of the crucible material.

In order to overcome these drawbacks, it has been tried to carry out the refining in a vacuum, in order so to stimulate the development of gases. These attempts, however, failed because the heat transfer to the glass batch could not be adequately controlled, inasmuch as the glass was heated from the outside of a ceramic crucible containing the glass, so that the heat had to be transmitted to the melt through this crucible. The relatively slow heat transfer so obtained did not make it possible to induce in the glass that exact temperature at which the bubbles escape easily on the one hand, while on the other no boiling over of the glass occurs.

These disadvantages can be eliminated in accordance with the invention by refining the melt in a platinum crucible which is at least partially heated by eddy current and, after the melt has attained the specified purifying temperature, generating above the melt a vacuum of from 0.7 to 0.95 atmos. In this way, the heat is directly transmitted from the crucible to the melt, so that it can be applied to the melt at the requisite speed and rate by controlling the current input.

The process can to advantage be shaped as follows:

The glass is melted down at normal pressure. By means of the eddy current heating or also by supplementary external heating, the melt is brought to the purifying temperature. In certain circumstances, it may be advisable to generate above the glass melt a slight vacuum or else a slight pressure, in order to forestall premature escape of gas bubbles, a condition which, as is well known, depends upon the bubble-forming tendency of the glass being treated.

For purifying, the pressure is reduced to about 0.7 to 0.95 atmos. vacuum when the desired refining temperature has been attained. Any further lowering of the pressure is, however, unfavorable for purifying because of the then ensuing excessive vaporization of the glass. By the reduction of pressure stated, a vehement gas development is set up in the melt, the intensity of which must be so regulated by the admission of air into the vacuum that the glass foams uniformly and vigorously but does not boil over. In the further progress of purification, the development of gas declines when temperature and pressure conditions remain unchanged. It is therefore advisable at this stage to raise the temperature by, say, 50° C. and gradually to improve the vacuum. Purification can be stopped when bubble generation ceases while temperature and pressure conditions remain stationary.

Heating the crucible with eddy current has the further advantage of preventing the vacuum furnace containing the crucible from becoming too hot, so that the progress of purification can be followed by observation through a window provided in the furnace.

A further advantage of the eddy current heating of the platinum crucible is that powerful convection currents arise inside the glass melt, so that continually new portions of the glass come to the surface. As is well known, gas bubbles expand and escape much more easily at the surface than further down, because a lower hydrostatic pressure acts upon the gas bubbles in higher than in lower zones, so that the refining process is speeded up. The effect of the convection currents can be further improved by stirring the melt by means of a vane type agitator hermetically sealed against the furnace.

The drawing depicts an apparatus to carry out the procedure. A glass melt 11 is in a platinum crucible 10. Around platinum crucible 10 a ceramic protection pot 12 is arranged. Around the protection pot 12 an induction coil 13 is placed. The coil wire is hollow and has inlet and outlet openings at 14 and 15 in order that cooling water can run through the coil wire. Ends 14 and 15 of the coil are connected to a high frequency source of current 16. The entire device is housed in a vacuum tight chamber 17. Chamber 17 is provided with an insulating material 18 in order to avoid heat losses. On chamber 17 a cover 19 is placed airtight which is also lined with the insulating material 18. An observation window 20 is let in the cover 19. The interior of chamber 17—19 is connected with a vacuum pump 22 through a tube 21. With tube 21 there is further connected a pressure gauge 23 and an air-inlet valve 24. The mode of operation of the device is as follows:

If a high frequency current is run through the induction coil, in the platinum crucible an eddy current is created which heats the platinum crucible and the glass melt 11. If a vacuum is created over the glass melt by switching on pump 22 the melt begins to froth intensively. This process can be observed through window 20. By regulating the current supply and by regulating the air pressure by actuating valve 24, an intensive and uniform escaping of bubbles from the melt is brought about. The effect of the connection currents can be further improved by stirring the melt by means of a vane type agitator 25, hermetically sealed against the furnace.

I claim:

1. In the process for the purification of glass by heating the glass melt in a crucible, the improvement which comprises heating the glass melt to the purification temperature in a platinum crucible by induction, producing eddy currents in the crucible, and thereafter applying a vacuum above the melt sufficient for the vigorous generation of bubbles in the melt without a boiling over of the melt, said vacuum being between about 0.7 and 0.95 atmospheres.

2. Improvement according to claim 1, which includes increasing said vacuum within said range after the initial application thereof to maintain said vigorous generation of bubbles in said melt.

3. Improvement according to claim 1, which includes gradually increasing the temperature of said melt after the initial application of said vacuum to maintain said vigorous generation of bubbles in the melt.

4. Improvement according to claim 1, which includes stirring the melt after the initial application of said vacuum to maintain said vigorous generation of bubbles in the melt.

References Cited in the file of this patent

UNITED STATES PATENTS

| | | |
|---|---|---|
| 805,139 | Hitchcock | Nov. 21, 1905 |
| 1,564,235 | Harrington | Dec. 8, 1925 |
| 1,601,523 | George | Sept. 28, 1926 |
| 2,286,903 | Dockerty | June 16, 1942 |

FOREIGN PATENTS

| | | |
|---|---|---|
| 16,541 | Netherlands | July 15, 1927 |